United States Patent
Calhau Gonçalves et al.

(10) Patent No.: US 11,404,957 B2
(45) Date of Patent: Aug. 2, 2022

(54) MOUNTING OF POWER CABLES FOR LIMITING COMMON MODE CURRENTS

(71) Applicant: VESTAS WIND SYSTEMS A/S, Aarhus N (DK)

(72) Inventors: Luis Miguel Calhau Gonçalves, Aarhus C (DK); Kenneth G. Hansen, Kjellerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/920,023

(22) Filed: Jul. 2, 2020

(65) Prior Publication Data
US 2021/0006154 A1 Jan. 7, 2021

(51) Int. Cl.
| | |
|---|---|
| *H02M 1/44* | (2007.01) |
| *F03D 13/20* | (2016.01) |
| *H02G 3/32* | (2006.01) |
| *H02M 1/12* | (2006.01) |

(52) U.S. Cl.
CPC ............. *H02M 1/44* (2013.01); *F03D 13/20* (2016.05); *H02G 3/32* (2013.01); *H02M 1/123* (2021.05)

(58) Field of Classification Search
CPC ......... H02M 1/123; H02M 1/44; F03D 13/00; F03D 13/20; F03D 80/82; F03D 80/85; H02G 3/32; Y02E 10/72; Y02E 10/728; Y02E 10/78
See application file for complete search history.

(56) References Cited

U.S. PATENT DOCUMENTS

| | | | |
|---|---|---|---|
| 3,458,163 | A | 7/1969 | Egerton-Smith |
| 2009/0095505 | A1 | 4/2009 | Hagbrandt et al. |
| 2010/0097023 | A1 | 4/2010 | Nakamura et al. |

(Continued)

FOREIGN PATENT DOCUMENTS

| | | |
|---|---|---|
| EP | 2505832 A2 | 10/2012 |
| EP | 2618437 A2 | 7/2013 |

(Continued)

OTHER PUBLICATIONS

Danish Patent and Trademark Office 1st technical examination of patent application PA201970427, dated Dec. 6, 2019.

(Continued)

*Primary Examiner* — Matthew V Nguyen
(74) *Attorney, Agent, or Firm* — Patterson + Sheridan, LLP

(57) ABSTRACT

A mounting device shaped for contact with at least a part of a circumference formed by a configuration of three separately electric isolated one-phase power cables and at least one electrically isolated one-phase common mode return cable positioned together so that electrically conductive portions of the respective cables form a symmetrical cross sectional pattern, wherein the mounting device is arranged for fixation of all of said three power cables and the at least one common mode return cable to an associated structure. This mounting device allows effective fixation of power cables in electric power systems involving a three-phase PWM converter, where common mode return cables are necessary, e.g. in a wind turbine. The mounting device allows an effective practical handling and freedom to choose cables with custom fit cross sectional areas as well as compliance with the required maximum temperatures.

9 Claims, 4 Drawing Sheets

(56) References Cited

U.S. PATENT DOCUMENTS

| | | | |
|---|---|---|---|
| 2011/0162865 A1 | 7/2011 | Ueno et al. | |
| 2015/0232197 A1 | 8/2015 | Teshima et al. | |
| 2017/0353080 A1* | 12/2017 | Thygesen | F03D 7/0224 |
| 2018/0145465 A1* | 5/2018 | Huber | H01R 13/6592 |

FOREIGN PATENT DOCUMENTS

| | | | | |
|---|---|---|---|---|
| EP | 2927487 A1 | 10/2015 | | |
| EP | 3284992 A1 | 2/2018 | | |
| EP | 3865707 A1 * | 8/2021 | | F03D 80/85 |
| KR | 2015000168 U | 5/2015 | | |
| WO | WO-2018113869 A1 * | 6/2018 | | F03D 9/30 |

OTHER PUBLICATIONS

Extended Eurpoean Search Report for Application No. 20177082.1201 dated Oct. 27, 2020.

* cited by examiner

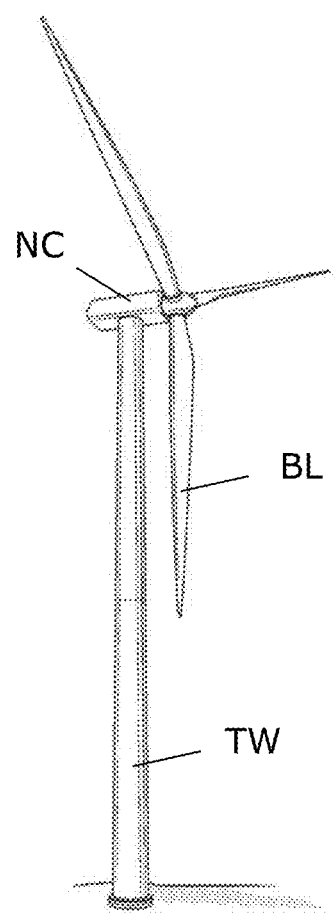
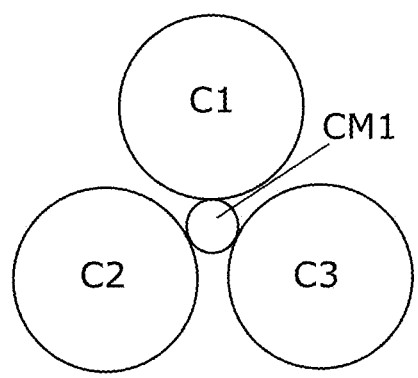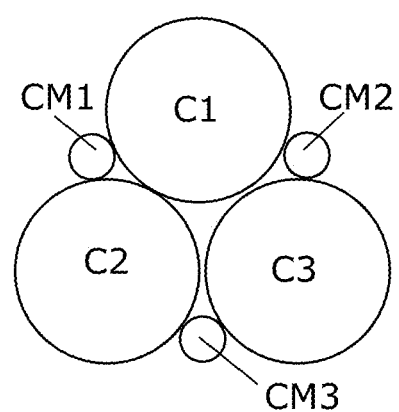
FIG. 1
FIG. 2
FIG. 3

MOUNTING OF POWER CABLES FOR LIMITING COMMON MODE CURRENTS

FIELD OF THE INVENTION

The present invention relates to the field of power cables, more specifically to the field of minimizing common mode currents in power cables, e.g. for three-phase power generation system, such as in a wind turbine. Specifically, the invention provides a method and a device for mounting power cables for reducing problems with common mode currents in high power transmission applications.

BACKGROUND OF THE INVENTION

In power electric applications involving switching components common mode currents or leakage currents constitute a known problem with electromagnetic compatibility (EMC) and stray current issues. E.g. in a three-phase Pulse Width Modulation (PWM) converter with only two output voltage levels available, the resulting neutral point voltage is not zero, and thus a common mode voltage is forced to flow to electric ground or earth via. This is an issue with a three-phase PWM converter connected to an electric motor or a generator.

The problem can be significantly reduced by providing a conductor for conducting the common mode current along with the three conductors serving to conduct the main current of the three main phases. Special 6-core cables are known which provide three conductors for the three main phases along with three common mode current conductors, all within a common isolation and shield. Furthermore, means for fixing of such 6-core cable to a structure to ensure retention of the cable to the structure, e.g. in a wind turbine, is simple and can be achieved with well-known cleats or other components.

However, e.g. in case of a high power wind turbine, where the required cross section of such 6-core cable becomes impractical to handle due to the large dimensions meaning that the weight of such cable is hard to handle for even two persons, and further such cables art so stiff that they have a limited curvature, thus requiring extra space when tight bends are required, e.g. as in the nacelle of a wind turbine.

Still further, the isolation material of standard 6-core cables typically has a limited maximum temperature capacity of 90° C., thus creating problem mounting such cables near or inside an electric generator where temperature of 100° C. or more are common.

SUMMARY

Thus, according to the above description, it may be seen as an object of the present invention to provide a method and a device for mounting of electric power cables including one or more common mode return conductors, especially for fixing the power cables for retention to a structure.

In a first aspect, the invention provides a mounting device for fixation of power cables, said mounting device comprising a shape for contact with at least a part of a circumference formed by a configuration of three separately electric isolated one-phase power cables and at least one electrically isolated one-phase common mode return cable, wherein the cables are positioned so that electrically conductive portions of the respective cables form a symmetrical cross sectional pattern, and wherein the mounting device is arranged for fixation of the symmetrical cross sectional pattern of all of said three power cables and the at least one common mode return cable to an associated structure.

The mentioned mounting device is advantageous, since it allows free choice of conductor dimensions and electric insulation material for the power cables and the common mode return cables. E.g. temperature ranges of the cables can easily be extended to allow high temperature cables which allow above 90° C., e.g. such as 90-120° C. or higher, so as to allow mounting of the cables to a high power generator which may reach internal temperatures of much higher than 90° C., e.g. in a high power wind turbine capable of producing three-phase electric power of 1 MW or more, and the symmetric cross sectional pattern of the conductive portions of the cables allow a PWM converter, especially, the power converter may be arranged to operate with a switching frequency of below 10 kHz, e.g. 1-10 kHz.

The free choice of the conductor dimensions allows the selection of the power cables to conduct the necessary electric current, while the common mode return cable(s) are typically much smaller, e.g. a factor of 5-30 smaller cross sectional area than the power cables. This provides a cabling with overall dimensions which are not larger than necessary, thereby providing increased flexibility in the handling during the mounting process and flexibility in the bending of the cables, thus saving space and costs. Furthermore, handling during mounting is facilitated by the fact that the single core cables can be handled separately instead of handling all cores in one as in the prior art. This is advantageous both for practical job of carrying the cables and for electrically connecting the single conductors.

The symmetric cross sectional pattern provides an optimized common mode reduction effect, and thus minimizes EMC problems and other disadvantages cause by common mode currents. The symmetry axis is understood to be an axis along a length of the cables, especially a central axis along a length of the cables.

The mounting device preferably comprises a cleat shaped to fit for contact with a significant part of a total circumference of the symmetrically arranged cables, so that the cleat allows fixation of the cables as a combined holding the single cables together to maintain the symmetrically shaped pattern, as well ensuring retention of the cables to the structure, e.g. by means of screws or the like through a part of the element.

The mounting device may need to be custom made to fit the selection of dimensions of the single core cables, however compared to special production of multi-core high temperature cables, such production of a polymeric or metallic structure with custom designed shape can be rather easily done, and the costs involved limited. E.g. a 3D printing process can be used to provide the desired shape, or in other implementations moulded versions may be preferred.

Especially, the mounting device according to the first aspect is used for mounting of power cables in nacelle and/or the tower of the wind turbine. Specifically, the wind turbine may be designed for generating electric power of 1 MW or more and to deliver an electric three-phase power output.

By "one-phase cable" is understood a cable with only one single conductor encapsulated by an insulator. The single conductor can be formed as one single solid conductor element or by a bunch of a plurality of several separate conductor elements encapsulated by one common insulator.

In the following, preferred embodiments and features will be described.

In preferred configurations, the cable mounting device is arranged for fixation of three single core power cables each with a first conductor core cross sectional area, as well as one or three single core common mode return cables each with a second cross sectional area, where the second cross sectional area is at least a factor of 5 smaller than the first cross sectional area.

Preferably, the mounting device comprises a cleat part shaped for contact with said at least a part of the circumference and for fixation to the associated structure. Preferably, the cleat part is shaped for contact with least 20% of a total circumference of the combined single core cables in the symmetric pattern. In embodiments with three common mode return cables, the cleat part may be shaped for contact with at least part of circumferences of one of the three power cables and two common mode return cables. Especially, the cleat part may be shaped for contact with at least part of circumferences of all of the three power cables and two common mode return cables. In some embodiments, the cleat part may comprise an upper cleat part and a lower cleat part, and wherein at least the lower cleat part or the upper cleat part is arranged for fixing to the associated structure. Especially, the upper cleat part may be shaped for contact with at least part of circumferences of a first of the three power cables and first and second common mode return cables. Especially, the lower cleat part may be shaped for contact with at least part of circumferences of a second of the three power cables and a third common mode return cable. The upper cleat part and the lower cleat part may be shaped to engage with each other, e.g. to facilitate mounting.

Preferably, all cables are designed for a temperature of at least 100° C., such as 120° C. Cables with a temperature capacity of 180° C. can be provided as standard components.

Embodiments especially suited for only one single common mode return cable, preferably comprise a spacer part comprising a central portion serving to at least partly encircle the one single common mode return cable, and further comprising three arms connected to said central portion, wherein the three arms serve to provide a fixed distance to the three power cables, when mounted fixed to the associated structure by means of the cleat part. Depending on the selected thickness of the arms, an increased space between the cables can be provided to improve thermal dissipation, and thus allow cables with smaller cross sectional for the rated current. Still, the spacer serves to maintain the symmetric position of one central common mode return cable. Specifically, the central portion of the spacer part may encircle at least 50% of the circumference of the common mode return cable, e.g. at least 80% of the circumference of the common mode return cable. The arms are preferably straight elements symmetrically arranged around the central portion in the form of an open ring. The spacer part is preferably formed as a monolithic polymeric element.

For the mentioned embodiments with a spacer part, a traditional standard fit cable clamp can be used for the fixing of the cables to the structure, e.g. a clamp which only has a limited contact with outer circumferences of the three power cable, since the central spacer part helps to keep the symmetric configuration.

As known in the art, an additional shielding conductor, e.g. an electrically conducting net, may be arranged around the three power cables and the one or more common mode return cables.

In a second aspect, the invention provides an electric power system comprising at least one mounting device according to the first aspect. In preferred embodiments, the electric power system may comprise an electric three-phase motor or generator, an electric three-phase PWM converter, a structure mechanically connecting the electric three-phase motor or generator with the three-phase PWM converter, a set of cables comprising three separately electric isolated one-phase power cables, and at least one electrically isolated one-phase common mode return cable, wherein the set of cables are electrically connected at one end to the electric three-phase motor or generator and electrically connected at the opposite end to the electric three-phase PWM converter, and least one mounting device according to the first aspect fixing the three separately electric isolated one-phase power cables and the at least one electrically isolated one-phase common mode return cable in a symmetrical cross sectional pattern to a part of said structure.

In a specific embodiment, the electric power system comprises a wind turbine comprising an electric three-phase generator, wherein a drive shaft of the electric three-phase generator is driven by one or more blades of the wind turbine, and wherein said structure comprises a part located in a nacelle of the wind turbine.

More specifically, the electric power system comprising a wind turbine may further comprise least 5 sets of cables, e.g. 8 sets of cables, each set of cables comprising three separately electric isolated one-phase power cables, and at least one electrically isolated one-phase common mode return cable, wherein the at least 5 sets of cables are electrically connected at one end to the electric three-phase generator and electrically connected at the opposite end to the electric three-phase PWM converter, and at least 5 mounting devices according to the first aspect, mounted to fix respective sets of the at least 5 sets of cables to parts of said structure located in the nacelle of the wind turbine structure.

In a third aspect, the invention provides a method for mounting of electric power cables connected to a switch type three-phase electric converter for fixation of the electric power cables to an associated structure, the method comprising providing three separately electric isolated one-phase power cables for connection to the respective electric phases of the converter, providing at least one electrically isolated one-phase common mode return cable for connection to the converter, positioning the three power cables and the at least one common mode return cable together, and so in relation to each other, that electrically conductive portions of the respective cables provide a symmetrical cross sectional pattern, so as to reduce common mode currents, providing a mounting device shaped for contact with at least a part of a circumference of said symmetrical cross sectional pattern of the three power cables and the at least one common mode return cable, and fixing all of the three power cables and the at least one common mode return cable to the associated structure by means of said mounting device while maintaining said symmetrical cross sectional pattern.

It is to be understood that the same advantages and preferred embodiments and features apply for the second and third aspects, as described for the first aspect, and the aspects may be mixed in any way.

BRIEF DESCRIPTION OF THE FIGURES

The invention will now be described in more detail with regard to the accompanying figures of which FIG. 1 illustrates a wind turbine in which the power cable mounting method and device is advantageously applied, FIGS. 2 and 3 illustrate two preferred configurations with one and three common mode return cables, respectively.

Figure 4:
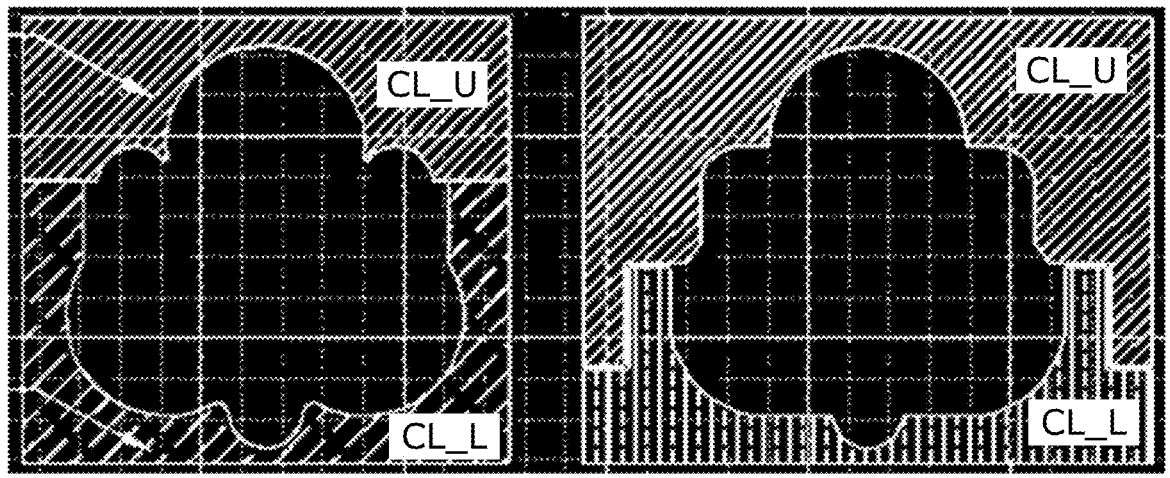
FIG. 4 illustrates two different cable cleat shapes for use for embodiments with three common mode return cables.

The figures illustrate specific ways of implementing the present invention and are not to be construed as being limiting to other possible embodiments falling within the scope of the attached claim set.

DETAILED DESCRIPTION

FIG. 1 illustrates a wind turbine with three rotor blades BL for driving a shaft of an electric power generator located inside the nacelle NC on top of a tower TW. Typically, a three-phase PWM type of power converter system in a wind turbine can be placed up-tower or down tower. For high power wind turbines, e.g. capable of producing 1 MW or more, the fixation of power cables for electrically connecting the PWM converter and the generator is complicated due to the combination of high temperatures, large dimensions of the cables for high power transfer, the necessity of common mode return cable(s) for reduction of electric noise emission problems, and the safety requirement of retention of the cables to the structure of the wind turbine to eliminate dangerous cable movements in case of a short-circuit emergency.

Even though beneficial for wind turbines, it is to be understood that the invention may be used as well in other electric power systems, especially system for handling of three-phase electric power to and from a PWM type converter.

FIGS. 2 and 3 illustrate two of the most preferred configurations of separate single-phase cables C1, C2, C3, and common mode return cables CM1, CM2, CM3. All cables C1, C2, C3, CM1, CM2, CM3 have circular cross section which provide a symmetric cross-sectional configuration of the electrical conductors, since the electrical conductors are located symmetrically inside the circular outer cross section provided by the electric insulation. However, it is to be understood that the invention is not limited to these configurations and the circular cross section. Further, as seen in FIGS. 2 and 3, the cross sectional area of the common mode return cables CM1, CM2, CM3 are smaller than the cross sectional areas of the power cables C1, C2, C3.

In FIG. 2 the three power cables C1, C2, C3 and one single common mode return cable CM1 are positioned close together with the common mode return cable CM1 in the centre, thereby providing a central axis of symmetry. The three power cables C1, C2, C3 are not in mutual contact, and can be thus preferably be held in this position by a spacer part which will be described in the following.

In FIG. 3, the three power cables C1, C2, C3 are positioned close together, i.e. their surfaces are in contact two by two. The three common mode return cables CM1, CM2, CM3 are positioned in the respective outer recesses formed by the three power cables C1, C2, C3, so that each of the three common mode return cables CM1, CM2, CM3 touches two of the three power cables C1, C2, C3.

In a high power wind turbine, the diameter of the conductor of the power cables C1, C2, C3 may be such as 100-250 mm, whereas the diameter of the conductor of the common mode return cables CM1, CM2, CM3 may be such as 2-20 mm, e.g. 5-10 mm.

FIG. 4 illustrates two different mounting device embodiments for the cable configuration of FIG. 3, in the form of a cleat with an upper part CL_U and a lower part CL_L which, when assembled, will encircle all 6 cables. The two embodiments will be described in the following referring to FIGS. 5a and 5b showing the upper part CL_U in relation to the cables.

Figure 5A:
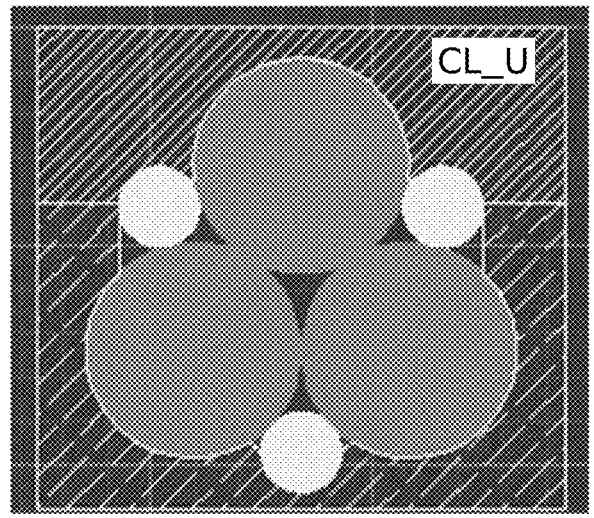
FIGS. 5a and 5b illustrate two different upper cleat parts for use for embodiments with three common mode return cables.

FIG. 5a illustrates one embodiment corresponding to the upper part CL_U of the cleat of left part of FIG. 4. This embodiment is shaped so that the upper part CL_U is in tight contact with a circumference of one power cable, about 50% of its circumference, and for contact with at least 20% of a circumference of two of the common mode return cables.

Figure 5B:
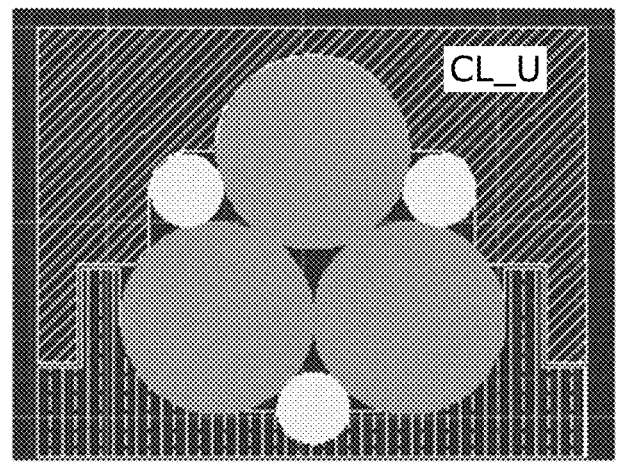

FIG. 5b illustrates another embodiment corresponding to the upper part CL_U of the cleat of right part of FIG. 4. Here, the upper part CL_U is substantially similar the embodiment of FIG. 5a with respect to contact with one power cable and two common mode return cables, but in addition this embodiment is shaped to provide contact with the two lower power cables, even though only at a very limited part of their circumferences, as seen.

The embodiments of FIGS. 4 and 5 may be formed e.g. in a polymeric material, e.g. 3D printed, if preferred, and may have holes in the side parts to allow a screw to penetrate and fix both parts CL_U, CL_L and thus also the cables to a structure.

Figure 6:
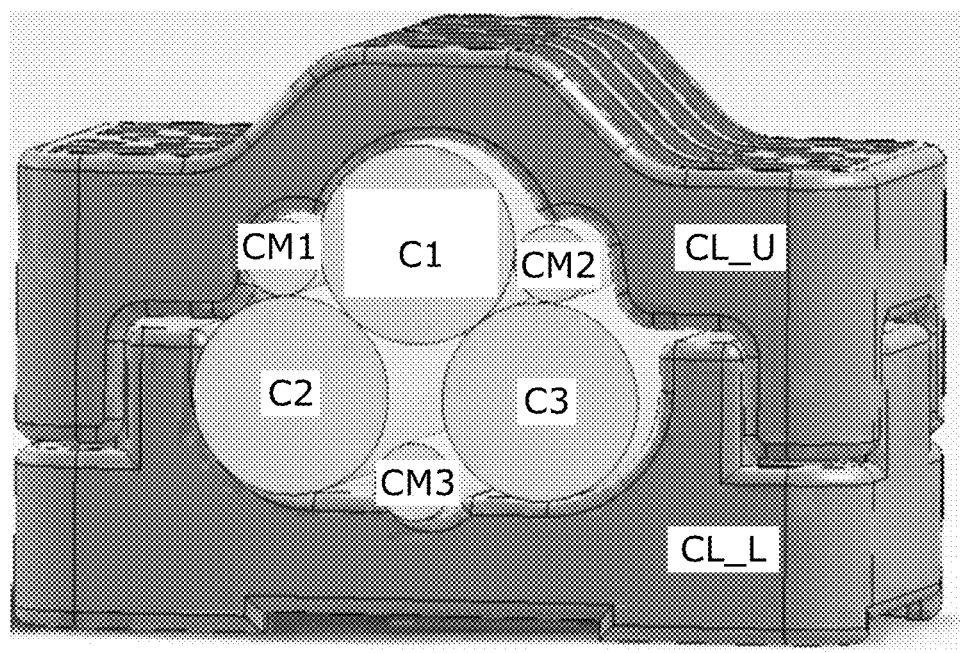
FIG. 6 illustrates a 3d sketch of a preferred cable cleat embodiment for use for embodiments with three common mode return cables, FIG. 7 illustrate two different spacer part embodiments, FIG. 8 illustrate the two different spacer part embodiments from FIG. 7 with cables and a cable clamp.

FIG. 6 shows a 3D sketch of yet another cleat embodiment with an upper part CL_U and a lower part CL_L which together encircle all 6 cables C1, C2, C2, CM1, CM2, CM3 configured as in FIG. 3. Essentially, the upper and lower cleat parts CL_U, CL_L are shaped for contact with the cables C1, C2, C2, CM1, CM2, CM3 as described for the embodiment of FIG. 5b. The upper and lower cleat parts CL_U, CL_L are arranged for mutual engagement in both sides, as seen. It is not visible, but preferably, vertical through-going holes through both parts CL_U, CL_L serve to allow screws or the like for fixation to an associated structure.

Figure 7:

FIG. 7 shows two different spacer part SP embodiments suited for the cable configuration with only one central common mode return cable as shown in FIG. 2. The spacer part SP has a central ring serving to partly encircle the common mode return cable, and three symmetrically positioned arms extending from the central ring. These arms serve to space the power cables to maintain a symmetric pattern. The spacer part SP embodiment to the left has two arms of equal thickness, while one of the arms has a higher thickness. The spacer part SP embodiment to the right has three arms of equal thickness.

Figure 8:
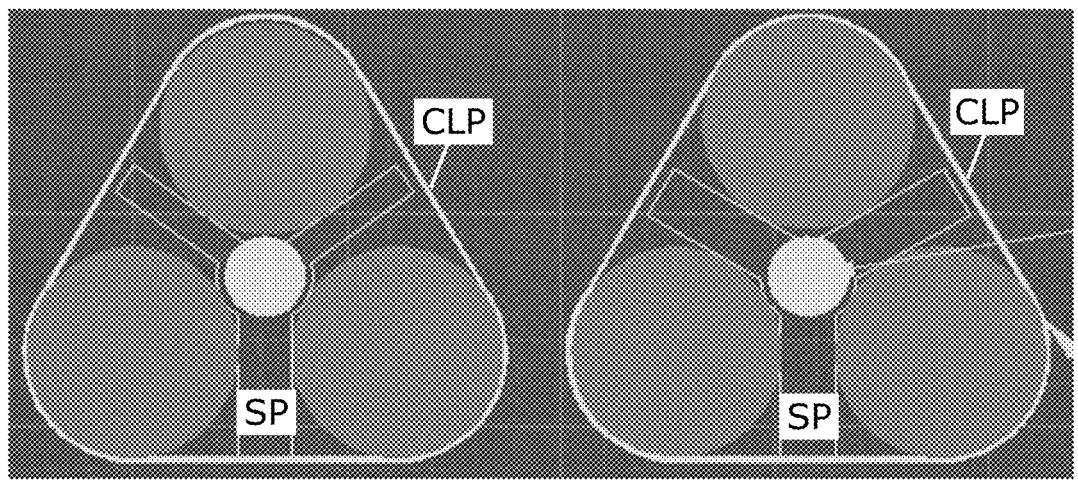

FIG. 8 shows the two spacer part SP embodiments of FIG. 7, but here with the cables show, along with a cable clamp CLP serving to keep all four cables tightly fixed together. The clamp CLP can be a standard cable clamp made of a metal, and preferably the clamp CLP has a portion (not shown) to be used for fixation to an associated structure.

Figure 9:
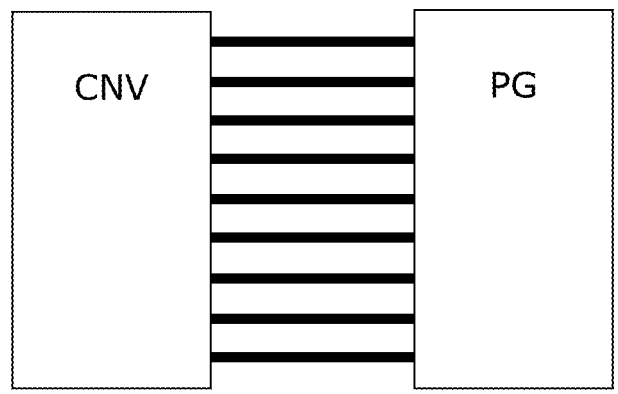
FIG. 9 illustrates a power system embodiment, where a three-phase PWM power converter is connected to an electric power generator by means of 8 sets of three-phase cables, where each set of cables is fixed according to the invention, and FIG. 10 illustrate steps of a method embodiment.

FIG. 9 shows an electric system power embodiment where a total of 8 sets of cables serve to connect a three PWM power converter and an electric generator PG, e.g. in a wind turbine. Each set of cables comprises three one-phase power cables and one or more one-phase common mode return cables, and is mounted to a structure (not shown), e.g. of a wind turbine, with respective mounting devices at one or more position along the cables. Each of the mounting devices involved are preferably one of the embodiments as described in the foregoing.

Figure 10:
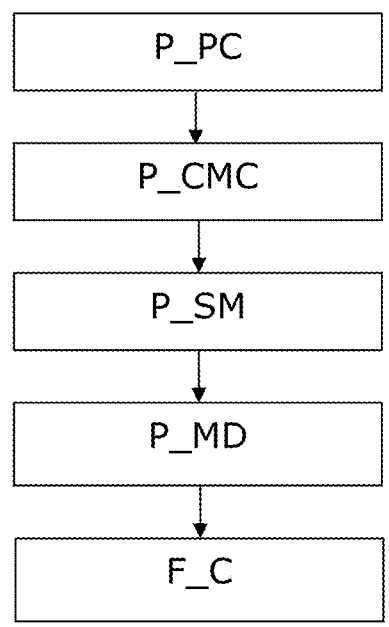

FIG. 10 illustrates steps of an embodiment of a method for mounting of electric power cables connected to a switch type three-phase electric PWM converter for fixation of the electric power cables to a structure in a wind turbine. The method comprises providing P_PC three separately electric isolated one-phase power cables for connection to the respective electric phases of the PWM converter, and providing P_CMC at least one electrically isolated one-phase common mode return cable for connection to the PWM converter. Next, step is positioning P_SM the three power cables and the at least one common mode return cable together, so in relation to each other, that electrically conductive portions of the respective cables provide a symmetrical cross sectional pattern, so as to reduce common mode currents. This is either done with one single common mode return cable in a centre configuration of with the three power cables positioned close together with three common mode return cables positioned at the respective three outer recesses formed by the three power cables. Next, providing a mounting device shaped for contact with at least a part of a circumference of said symmetrical cross sectional pattern of the three power cables and the at least one common mode return cable, and then fixing all of the three power cables and the at least one common mode return cable to the structure of the wind turbine by means of the mounting device, e.g. comprising a specially shaped cable cleat or a spacer part together with a standard cable clamp, while maintaining said symmetrical cross sectional pattern.

The method is suited for high power system, e.g. high power wind turbines of 1 MW or more, where heavy power cables are needed, since the power cables for each phase can be handled in small spaces such as in the nacelle of a wind turbine, i.e. carried, electrically connected, and bent into shape, and positioned, separately in contrast to prior art multi-core cables.

To sum up: the invention provides a mounting device shaped for contact with at least a part of a circumference formed by a configuration of three separately electric isolated one-phase power cables and at least one electrically isolated one-phase common mode return cable positioned together so that electrically conductive portions of the respective cables form a symmetrical cross sectional pattern, wherein the mounting device is arranged for fixation of all of said three power cables and the at least one common mode return cable to an associated structure. This mounting device allows effective fixation of power cables in electric power systems involving a three-phase PWM converter, where common mode return cables are necessary, e.g. in a wind turbine. The mounting device allows an effective practical handling and freedom to choose cables with custom fit cross sectional areas as well as compliance with the required maximum temperatures. The latter is important e.g. in high power wind turbines with electric generators which may reach temperatures exceeding the operating temperatures of standard power cables.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A mounting device for fixation of power cables, comprising:
    a body shaped for contact with at least a part of a circumference formed by a configuration of three separately electrically isolated one-phase power cables and an electrically isolated one-phase common mode return cable, wherein the one-phase power cables and the one-phase common mode return cable are positioned so that electrically conductive portions of the one-phase power cables and the one-phase common mode return cable form a symmetrical cross sectional pattern;
    a cleat part shaped for contact with the at least a part of the circumference and for fixation to an associated structure; and
    a spacer part comprising a central portion serving to at least partly encircle the one-phase common mode return cable, and further comprising three arms connected to the central portion, wherein the three arms serve to provide a fixed distance to the three one-phase power cables when the cleat part is fixed to the associated structure.

2. The mounting device according to claim 1, wherein the central portion of the spacer part encircles at least 50% of the circumference of the one-phase common mode return cable.

3. A mounting device comprising:
    a body shaped for contact with at least a part of a circumference formed by a configuration of three separately electrically isolated one-phase power cables and at least two electrically isolated one-phase common mode return cables, wherein the one-phase power cables and the at least two one-phase common mode return cables are positioned so that electrically conductive portions of the one-phase power cables and the at least two one-phase common mode return cables form a symmetrical cross sectional pattern;
    an upper cleat part; and
    a lower cleat part arranged to interlock with the upper cleat part such that the upper cleat part and the lower cleat part are arranged for contact with at least part of circumferences of the three one-phase power cables and the at least two one-phase common mode return cables.

4. The mounting device according to claim 3, wherein the upper cleat part is shaped for contact with at least part of circumferences of a first of the three one-phase power cables and first and second common mode return cables.

5. The mounting device according to claim 4, wherein the lower cleat part is arranged for contact with at least part of circumferences of a second of the three one-phase power cables and a third common mode return cable.

6. The mounting device according to any of claim 3, where the upper cleat part and the lower cleat part are shaped to engage with each other.

7. A system, comprising:
an electric three-phase motor or generator;
an electric three-phase PWM converter;
a set of cables comprising three separately electrically isolated one-phase power cables and at least one electrically isolated one-phase common mode return cable, wherein the set of cables is electrically connected at one end to the electric three-phase motor or generator and electrically connected at an opposite end to the electric three-phase PWM converter; and
at least one mounting device, comprising a body shaped for contact with at least a part of a circumference formed by the three separately electrically isolated one-phase power cables and the at least one electrically isolated one-phase common mode return cable, wherein the set of cables is positioned so that the three one-phase power cables and the at least one one-phase common mode return cable form a symmetrical cross sectional pattern, and wherein the at least one mounting device is arranged for fixation of the set of cables to an associated structure.

8. The system according to claim 7, comprising a wind turbine comprising an electric three-phase generator, wherein a drive shaft of the electric three-phase generator is driven by one or more blades of the wind turbine, and wherein the wind turbine comprises a part located in a nacelle of the wind turbine.

9. The system according to claim 8, comprising:
at least 5 sets of cables, each set of cables comprising three separately electric isolated one-phase power cables, and at least one electrically isolated one-phase common mode return cable, wherein the at least 5 sets of cables are electrically connected at one end to the electric three-phase generator and electrically connected at the opposite end to the electric three-phase PWM converter, and
at least 5 mounting devices mounted to fix respective sets of the at least 5 sets of cables to parts of the wind turbine located in the nacelle of the wind turbine.

* * * * *